United States Patent
Hill (10) Patent No.: US 8,032,304 B2
(45) Date of Patent: Oct. 4, 2011

(54) SYSTEM AND METHOD FOR DERIVING SEISMIC WAVE FIELDS USING BOTH RAY-BASED AND FINITE-ELEMENT PRINCIPLES

(75) Inventor: Norman Ross Hill, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 406 days.

(21) Appl. No.: 12/246,301

(22) Filed: Oct. 6, 2008

(65) Prior Publication Data

US 2010/0088034 A1    Apr. 8, 2010

(51) Int. Cl.
*G01V 1/28* (2006.01)
*G01V 1/00* (2006.01)

(52) U.S. Cl. .......................................... 702/14; 367/38

(58) Field of Classification Search ................ 702/14; 367/38
See application file for complete search history.

(56) References Cited

U.S. PATENT DOCUMENTS

| | | | |
|---|---|---|---|
| 4,745,585 A * | 5/1988 | Larner | 367/50 |
| 4,964,088 A | 10/1990 | Chittineni | |
| 5,274,605 A | 12/1993 | Hill | |
| 5,999,488 A | 12/1999 | Smith | |
| 6,278,950 B1 | 8/2001 | Kim et al. | |
| 2006/0056272 A1 | 3/2006 | Hill | |

OTHER PUBLICATIONS

Koshiba, M., Tsuji, Y and Hikari, M., 1999, Finite element beam propagation method with perfectly matched layer boundary conditions, IEEE Transactions on Magnetics, vol. 35, pp. 1482-1485.
Koshiba, M., 1996, A wide-angle finite-element beam propagation method, IEEE Photonics Technology Letters, vol. 8, pp. 1208-1210.
Plessix, R.-E., 2007, A Helmholtz iterative solver for 3D seismic-imaging problems, Geophysics, vol. 72(5), pp. SM185-5M194.
Riyanti, C. D., Erlangga, Y. A., Plessix, R.-E., Mulder, W. A., Vuik, C., and Oosterlee, C., 2006, A new iterative solver for the time-harmonic wave equation, Geophysics, vol. 71(5), pp. E57-E63.
Nichols, Dave E., Maximum energy traveltimes calculated in the seismic frequency band, Geophysics, vol. 61, No. 1 (Jan.-Feb. 1996); p. 253-263.
Alkahalifah, et al., Velocity analysis for transversely isotropic media, Geophysics, vol. 60, (1995), pp. 1550-1566.
Bachrach, Ran, et al., Integrated Solutions, Using Geomechanical modeling and wide-azimuth data to quantify stress effects and anisotropy near salt bodies in the Gulf of Mexico, Integrated Solutions, WesternGreco, eight pages.
Bleistein, On the imaging of reflectors in the earth, Geophysics, vol. 52, (1987) pp. 931-942.

(Continued)

*Primary Examiner* — Bryan Bui
(74) *Attorney, Agent, or Firm* — Carlos L. Hanze (57) ABSTRACT

A system and method approximate a set of wave equations describing the propagation of seismic waves of one or more frequencies through a seismic volume of interest. In one embodiment, a ray-based initial beam solution is determined that describes the propagation of seismic waves at a first frequency through the seismic volume of interest as a set of one or more beams. Based on the ray-based initial beam solution, a refined finite-element beam solution is determined that describes the propagation of the seismic waves at the first frequency through the seismic volume of interest by approximating the two-way wave equation with a one-way wave equation.

15 Claims, 7 Drawing Sheets

OTHER PUBLICATIONS

Cerveny, Seismic rays and ray intensities in inhomogeneous anisotropic media, Geophysical Journal, vol. 29, (1972), pp. 1-13.

Dickens, Ray tracing in tilted transversely isotropic media: a group velocity approach, SEG Extended Abstracts, vol. 23, (2004), pp. 973-976.

Gajewski et al., Vertical seismic profile synthetics by dynamic ray tracing in laterally varying layered anisotropic structures, Journal of Geophysics Res., vol. 95, (1990) pp. 11301-11315.

Giladi, E. and Keller, J. B., A hybrid numerical asymptotic method for scattering problems, Journal of Computational Physics, vol. 174, 2001 pp. 226-247.

Gray, Samuel H., Gaussian beam migration of common-shot records, Geophysics, vol. 70, No. 4, Jul.-Aug. 2005, pp. S71-S77.

Iverson et al., Ray tracing for continuously rotated local coordinates belonging to a specified anisotropy, Stud. Geophys. Geod., (2007) vol. 51, pp. 59-88.

Thomsen, Weak elastic anisotropy, Geophysics, vol. 51, (1986) pp. 1954-1966 (1986).

Zhu et al., Prestack Gaussian-beam depth migration in anisotropic media, Geophysics, vol. 72, (2007) pp. S133-S138.

Bleistein, Norman ; Mathematics of Modeling, Migration and Inversion with Gaussian Beams, Sep. 22, 2009.

Ross, Norman Hill; Prestack Gaussian-Beam Depth Migration, Geophysics, vol. 66, No. 4 Jul./Aug. 2001, p. 1240-1250.

* cited by examiner

SYSTEM AND METHOD FOR DERIVING SEISMIC WAVE FIELDS USING BOTH RAY-BASED AND FINITE-ELEMENT PRINCIPLES

FIELD OF THE INVENTION

The invention relates to the derivation of subsurface seismic wave fields within geological materials from seismic data collected at or near the surface.

BACKGROUND OF THE INVENTION

Systems that derive wave fields of seismic energy within a seismic volume of interest from seismic data recorded at or near the surface of the seismic volume of interest are known. These systems implement various techniques for deriving the seismic wave fields.

For example, some of these techniques implement ray-based principles that decompose wave fields recorded at or near the surface to extrapolate the seismic waves downward into the earth as rays. Some such techniques implement summation of a set of functions, such as Gaussian beams, to describe propagation of seismic energy as beams. While the use of beams to describe the waves propagating through the seismic volume of interest enhances ray-based processing, the accuracy of these techniques is still lacking for seismic volumes containing complex structures. The accuracy of ray-based analysis is especially degraded at lower frequencies, where wave propagation becomes less localized.

As another example, some techniques for deriving subsurface wave fields use finite-element methods to describe subsurface seismic wave fields. While the accuracy of these techniques is generally superior to ray-based analysis, particularly at lower frequencies and for complex structures, finite-element techniques tend to be resource intensive. For example, finite-element techniques tend to require extensive computing resources, such as processing and/or storage, and may require a significant amount of time. Moreover, ray-based methods support the conceptualization, analysis and interpretation of seismic energy propagation much more than purely numerical methods such as standard finite element and finite difference methods.

SUMMARY

One aspect of the invention relates to a method of approximating a set of wave equations describing the propagation of seismic waves of one or more frequencies through a seismic volume of interest. In one embodiment, the method comprises (a) defining a mesh through a seismic volume of interest; (b) determining a ray-based initial beam solution that approximates the propagation of seismic waves at a first frequency through the seismic volume of interest as a set of one or more beam; (c) identifying a set of active vertices in the mesh through which at least one of the set of one or more beams represented in the ray-based initial beam solution passes, the set of active vertices comprising a first active vertex and a second active vertex; (d) storing the ray-based initial beam solution at individual ones of the active vertices; (e) generating a system of equations that define a finite element approximation of a wave equation describing the propagation of the seismic waves of the first frequency through the seismic volume of interest, wherein individual ones of the equations included in the system of equations correspond to individual ones of the active vertices; (f) solving the system of equations generated at step (e) implementing the ray-based initial beam solution stored for the active vertices at step (d) as a starting solution to the system of equations, thereby creating a refined finite element beam solution approximating the propagation of the seismic waves of the first frequency through the seismic volume of interest with an enhanced accuracy over the approximation of the ray-based initial beam solution; (g) storing the refined finite element beam solution achieved at step (f); (h) identifying a second frequency; (i) identifying one or more additional vertices within the mesh through which seismic waves of the second frequency likely propagated; (j) determining an approximate initial beam solution of seismic wave propagation at the second frequency through the active vertices identified at steps (c) and (i), wherein the approximate initial beam solution at the second frequency is obtained using ray-based approximations to modify the refined finite -element beam solution for the first frequency achieved at step (f); (k) generating a system of equations that define a finite element approximation of a wave equation describing the propagation of the seismic waves of the second frequency through the seismic volume of interest, wherein individual ones of the equations included in the system of equations correspond to individual ones of the active vertices identified at steps (c) and (i); and (l) solving the system of equations generated at step (k) implementing the approximate initial beam solution determined at step (j) as a starting solution to the system of equations generated at step (k), thereby creating a refined finite element beam solution approximating the propagation of the seismic waves of the second frequency through the seismic volume of interest.

Another aspect of the invention relates to a method of approximating a set of wave equations describing the propagation of seismic waves of one or more frequencies through a seismic volume of interest. In one embodiment, the method comprises (a) determining a ray-based initial beam solution that describes the propagation of seismic waves at a first frequency through the seismic volume of interest as a set of one or more beams; and (b) determining, based on information derived from the ray-based initial beam solution, a refined finite-element beam solution that describes the propagation of the seismic waves at the first frequency through the seismic volume of interest by approximating the two-way wave equation with a one-way wave equation derived such that the axis of the one-way wave equation are oriented in the direction of flux determined according to the ray-based initial beam solution determined at step (a).

Yet another aspect of the invention relates to a system configured to approximate a set of wave equations describing the propagation of seismic waves of one or more frequencies through a seismic volume of interest. In one embodiment, the system comprises a ray-based module and a finite-element based module. The ray-based module is configured to determine a ray-based initial beam solution that describes the propagation of seismic waves at a first frequency through the seismic volume of interest as a set of one or more beams. The finite-element module is configured to determine, based on information derived from the ray-based initial beam solution determined by the ray-based module, a refined finite-element beam solution that describes the propagation of the seismic waves at the first frequency through the seismic volume of interest by approximating the two-way wave equation with a one-way wave equation derived such that the axis of the one-way wave equation is oriented in the direction of flux determined according to the ray-based initial beam solution.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
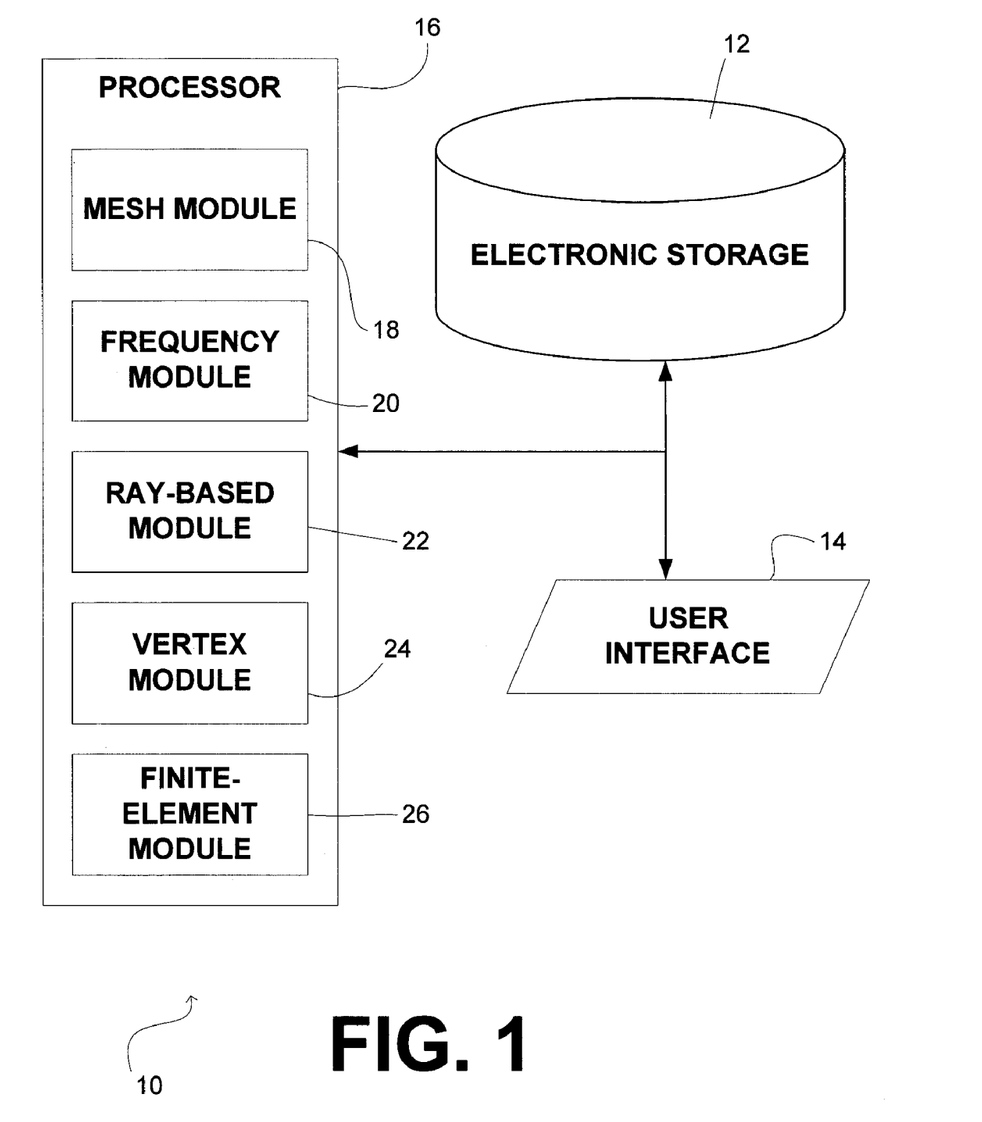
FIG. 1 illustrates a system 10 configured to determine wave fields of seismic wave propagating through geological media, according to one or more embodiments of the invention.

FIG. 1 illustrates a system 10 configured to determine wave fields of seismic wave propagating through geological media. In migrating the seismic wave information, system 10 decomposes wave fields recorded at or near the earth's surface using discrete, windowed Fourier transforms with a Gaussian window to match the recorded wavefield to a set of Gaussian beams, and extrapolates the set of Gaussian beams downward into the earth to obtain the subsurface wavefield. To obtain the subsurface wavefield, system 10 implements finite element principles and ray-based principles, rather than only one or the other. In one embodiment, system 10 includes electronic storage 12, a user interface 14, and a processor 16.

In one embodiment, electronic storage 12 comprises electronic storage media that electronically stores information. The electronically storage media of electronic storage 12 may include one or both of system storage that is provided integrally (i.e., substantially non-removable) with system 10 and/ or removable storage that is removably connectable to system 10 via, for example, a port (e.g., a USB port, a firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 12 may store software algorithms, information determined by processor 16, information received via user interface 14, and/or other information that enables system 10 to function properly. Electronic storage 12 may be a separate component within system 10, or electronic storage 12 may be provided integrally with one or more other components of system 10 (e.g., processor 16).

In one embodiment, user interface 14 is configured to provide an interface between system 10 and one or more users through which the one or more users may provide information to and receive information from system 10. This enables data, results, and/or instructions and any other communicable items, collectively referred to as "information," to be communicated between the one or more users and other components of system 10 (e.g., one or both of processor 16 and/or electronic storage 12). Examples of interface devices suitable for inclusion in user interface 14 include a keypad, buttons, switches, a keyboard, knobs, levers, a display screen, a touch screen, speakers, a microphone, an indicator light, an audible alarm, and a printer. In one embodiment, user interface 14 actually includes a plurality of separate interfaces.

It is to be understood that other communication techniques, either hard-wired or wireless, are also contemplated by the present invention as user interface 14. For example, the present invention contemplates that user interface 14 may be integrated with a removable storage interface provided by electronic storage 12. In this example, information may be loaded into system 10 from removable storage (e.g., a smart card, a flash drive, a removable disk, etc.) that enables the user(s) to customize the implementation of system 10, provide data to system 10, receive results from system 10, and/or otherwise communicate information with system 10. Other exemplary input devices and techniques adapted for use with system 10 as user interface 14 include, but are not limited to, an RS-232 port, RF link, an IR link, modem (telephone, cable or other). In short, any technique for communicating information with system 10 is contemplated by the present invention as user interface 14.

In one embodiment, processor 16 is configured to provide information processing capabilities in system 10. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination.

As is shown in FIG. 1, in one embodiment, processor 16 includes a mesh module 18, a frequency module 20, a ray-based module 22, a vertex module 24, a finite-element module 26, and/or other modules. Modules 18, 20, 22, 24, and/or 26 may be implemented in software; hardware; firmware; some combination of software, hardware, and/or firmware; and/or otherwise implemented. It should be appreciated that although modules 18, 20, 22, 24, and 26 are illustrated in FIG. 1 as being co-located within a single processing unit, in implementations in which processor 16 includes multiple processing units, modules 18, 20, 22, 24, and/or 26 may be located remotely from the other modules. Further, the description of the functionality provided by the different modules 18, 20, 22, 24, and/or 26 described below is for illustrative purposes, and is not intended to be limiting, as any of modules 18, 20, 22, 24, and/or 26 may provide more or less functionality than is described. For example, one or more of modules 18, 20, 22, 24, and/or 26 may be eliminated, and some or all of its functionality may be provided by other ones of modules 18, 20, 22, 24, and/or 26. As another example, processor 16 may include one or more additional modules that may perform some or all of the functionality attributed below to one of modules 18, 20, 22, 24, and/or 26.

Figure 2:
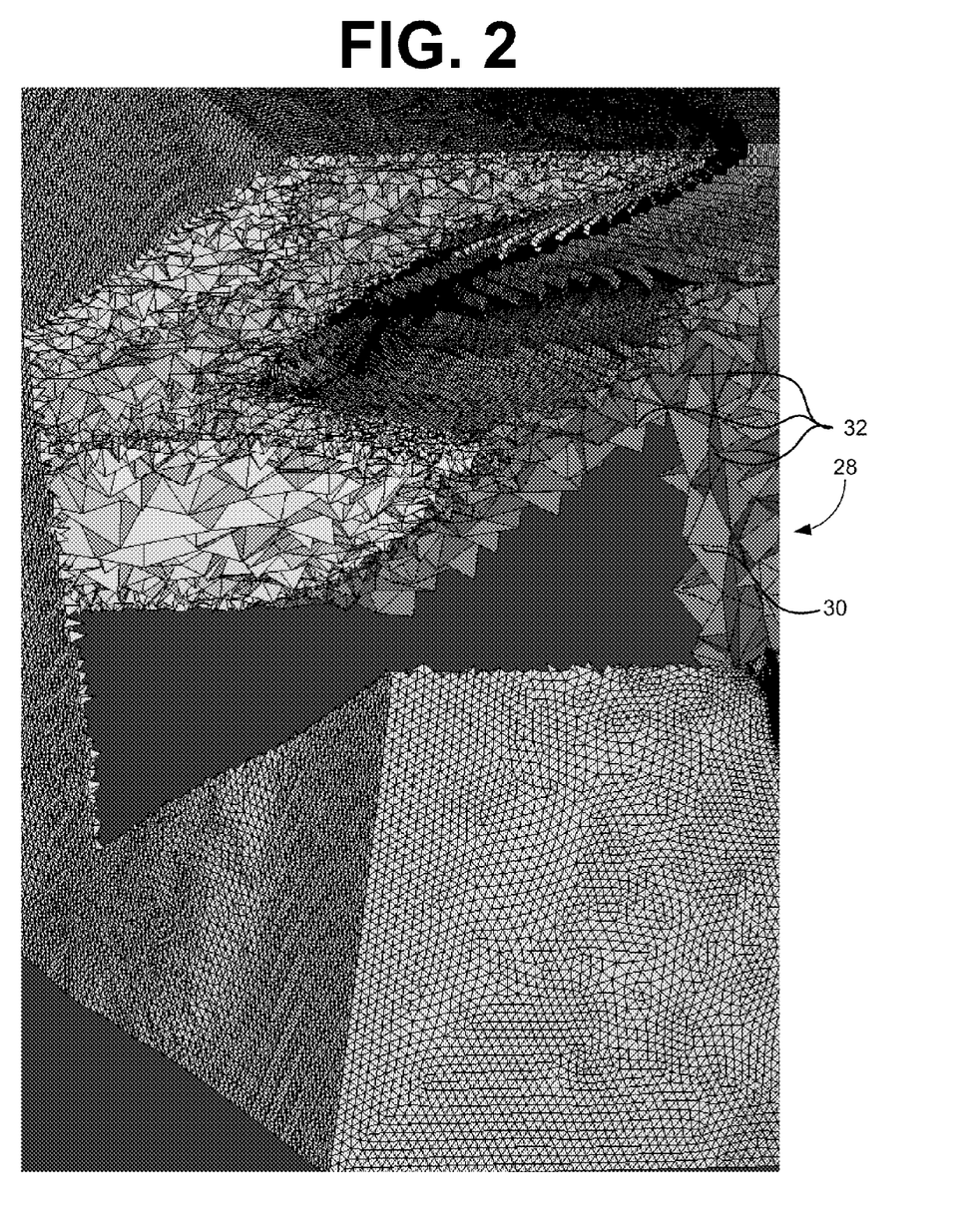
FIG. 2 illustrates a seismic volume of interest having a mesh defined therethrough, in accordance with one or more embodiments of the invention.

Mesh module 18 is configured to define a mesh through a seismic volume of interest. The seismic volume of interest is a representation of a subsurface geologic volume derived from a dataset (e.g., obtained via one or both of electronic storage 12 and/or user interface 14) of seismic data taken at or near the subsurface geologic volume. In one embodiment, the mesh defined by mesh module 18 is tetrahedral and/or unstructured (e.g., non uniform). Each element of the mesh contains values of geologic properties of the earth's subsurface (e.g., seismic velocities, etc.) represented within the mesh elements. By way of illustration, FIG. 2 shows a seismic volume of interest 28, have a mesh 30 formed throughout. As can be seen in FIG. 2, the definition of mesh 30 through seismic volume of interest 28 provides a set of vertices 32 distributed throughout seismic volume of interest 28.

Referring back to system 10 in FIG. 1, in analyzing seismic wave fields recorded at the surface of the seismic volume of interest to generate the corresponding subsurface wave fields, system 10 extrapolates Gaussian beams from the surface into the seismic volume of interest at different frequencies (in accordance with the seismic data obtained at the surface), and then aggregates the beams (determined for different frequencies) to obtain the cumulative subsurface wavefield. In order to accomplish this, frequency module 20 determines a set of frequencies at which Gaussian beams will be extrapolated into the seismic volume of interest. In one embodiment, the set of frequencies includes frequencies within a range of frequencies of interest that includes frequencies at which the propagation of seismic waves reveals information about the geological structures present in the seismic volume of interest. As such, these frequencies may be termed geologically significant.

The range of geologically significant frequencies is bounded by a maximum geologically significant frequency and a minimum geologically significant frequency determined by frequency module 20. By way of non-limiting example, the maximum geologically significant frequency may be approximately 100 Hz, approximately 90 Hz, approximately, 80 Hz, and/or other maximum geologically significant frequencies may be determined. Also by way of non-limiting example, the minimum geologically significant frequency may be approximately 2 Hz, approximately 5 Hz, approximately 10 Hz, and/or other minimum geologically significant frequencies may be determined. One or both of the maximum geologically significant frequency and/or the minimum geologically significant frequency may be determined by frequency module 20 based on user inputs (e.g., via user interface 14), application defaults, the coarseness or fineness, mesh sampling, and/or based on other parameters.

The range of geologically significant frequencies includes a set of geologically significant frequencies between the maximum geologically significant frequency and the minimum geologically significant frequency. In one embodiment, the set of geologically significant frequencies are frequencies that occur between the maximum geologically significant frequency and the minimum geologically significant frequency at a uniform frequency sampling rate. The uniform frequency sampling rate may be determined by frequency module 20 based on user inputs (e.g., via user interface 14), application defaults, mesh complexity, the degree of seismic velocity heterogeneity, and/or based on other parameters. In one embodiment, the sampling of frequencies in the set of geologically significant frequencies is not uniform through the range of geologically significant frequencies. For example, the sampling may be denser over one or more ranges within the range of geologically significant frequencies for one or more of a variety of reasons. The reasons for sampling the range of geologically significant frequencies more densely within one or more ranges may include, for instance, to resolve with an enhanced accuracy certain structures or types of structures within the seismic volume of interest, to more efficiently use processing resources on ranges of frequencies that provide the greatest enhancement to accuracy, to better use the solution obtained at one frequency sample to guide the starting solution at a neighboring frequency sample, and/or other reasons.

As will be discussed further below, system 10 implements a technique of extrapolating the Gaussian beams through the seismic volume of interest that blends together ray-based and finite-element principles. However, the initial approximation of the seismic waves through the seismic volume of interest is made using a ray-based approximation. The accuracy of ray-based approximations of seismic waves, even when the ray-based approximation implements the method of Gaussian beams, is greatest at relatively high frequencies. For this and other reasons, frequency module 20 may determine the set of frequencies of interest for which Gaussian beams are extrapolated into the seismic volume of interest such that the set of frequencies of interest includes one or more preliminary frequencies that are not within the range of geologically significant frequencies. Instead, in one embodiment, the one or more preliminary frequencies are higher than the maximum geologically significant frequency. This may enhance the accuracy of the approximation of the seismic waves derived wholly according to a ray-based Gaussian beam solution, which can then be used in conjunction with finite-element principles to derive approximations of the seismic waves within the seismic volume of interest at lower frequencies, such as frequencies within the range of geologically significant frequencies.

By way of non-limiting example, the one or more preliminary frequencies may include a maximum preliminary frequency of approximately 150 Hz, approximately 140 Hz, approximately 130 Hz, and/or other preliminary frequencies. In one embodiment, the one or more preliminary frequencies includes a plurality of frequencies, and the intervals between the preliminary frequencies is greater than the intervals between frequencies in the set of geologically significant frequencies. In one embodiment, one or more of the maximum preliminary frequency, the space of intervals between the preliminary frequencies, the number of preliminary frequencies and/or other aspects of the preliminary frequencies are determined based on user inputs (e.g., via user interface 14), application defaults, and/or based on other parameters.

Ray-based module 22 is configured to apply ray-based principles in approximating the propagation of seismic waves through the seismic volume of interest. At the beginning of an analysis of the seismic volume of interest, ray-based module 22 determines a ray-based initial beam solution that approximates the propagation of seismic waves down through the seismic volume of interest at an initial frequency in the set of frequencies determined by frequency module 20. In some implementations, the initial frequency is a maximum geologically significant frequency and/or a maximum preliminary frequency, and system 10 iterates downward in frequency from this initial frequency. In one embodiment, ray-based module 22 implements the technique described in U.S. Pat. No. 5,274,605, entitled "Depth Migration Method Using Gaussian Beams," and issued Dec. 28, 1993 ("the '605 Patent"), which is hereby incorporated into this disclosure in its entirety.

While the ability to iterate downward in frequency is one feature of the analysis provided by system 10, this is not intended to limit all implementations of system 10 to involve iteration downward in frequency. In some instances, the initial frequency will be a relatively low frequency, and system 10 may iterate upward and/or downward from this relatively low initial frequency. The implementation of a relatively low initial frequency may result in a solution involving a greater number of mesh points than a relatively high (or maximum) initial frequency, which may enhance some aspects of the final solution achieved by system 10. Instead of only iterating downward from the initial frequency, system 10 may iterate upward and/or downward in frequency from the relatively low initial frequency.

Figure 3:
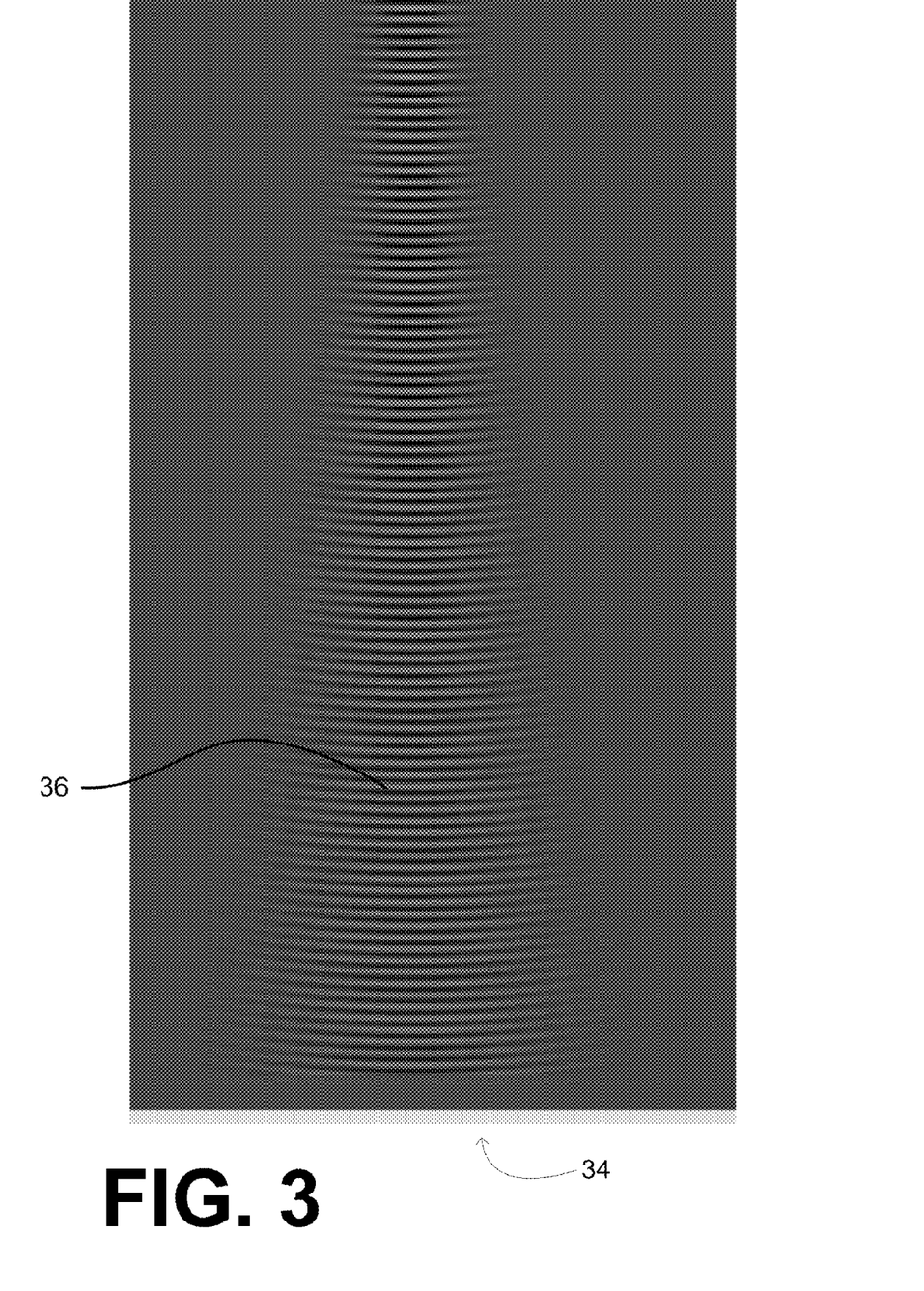
FIG. 3 illustrates an initial ray-based beam solution for an initial frequency, according to one or more embodiments of the invention.

By way of illustration, FIG. 3 shows a sectional view of a seismic volume of interest 34 with an initial ray-based beam solution 36 at an initial frequency using the well-known Gaussian beam method to construct the wavefield. The initial frequency depicted in FIG. 3 is relatively high, and may be the maximum frequency of interest. In seismic volume of interest 34, a low velocity inclusion is located to the right of the waves propagating through seismic volume of interest 34 at the initial frequency. Because the ray used to construct the wavefield does not touch the inclusion, the waves in solution 36 are not significantly impacted by the inclusion.

Returning now to the description of system 10 in FIG. 1, vertex module 24 is configured to identify vertices in the mesh (defined by mesh module 18) through the seismic volume of interest through which the initial ray-based beam solution determined by ray-based module 22 passes. These vertices are active vertices.

Based on the identification of a set of active vertices by vertex module 24, the ray-based module 22 then stores the ray-based initial beam solution at each of the active vertices (e.g., to electronic storage 12), and information derived from the ray-based initial beam solution. The information derived from the ray-based initial beam solution may include one or more of travel time (e.g., the real part of travel time), energy flux (e.g., the direction of energy flux averaged over a neighborhood within about one wavelength from an active vertex), and/or other information derived from the ray-based initial beam solution.

Finite-element module 26 is configured to implement finite-element principles in determining a beam solution that approximates the propagation of seismic waves through the seismic volume of interest. In one embodiment, finite-element module 26 implements the ray-based initial beam solution determined by ray-based module 22 for the initial frequency and the active vertices identified by vertex module 24 to derive a refined finite-element beam solution that approximates the propagation of seismic waves through the seismic volume of interest at the initial frequency. The accuracy of the refined finite-element beam solution is enhanced with respect to the accuracy of the ray-based initial beam solution.

To derive the refined finite-element beam solution for the initial frequency, finite-element module 26 assigns a coordinate system to each of the active vertices. The coordinate systems are assigned based on information derived from the ray-based initial beam solution. In one embodiment, the coordinate systems are assigned such that for a given active vertex one axis (e.g., the z axis) of the coordinate system assigned to the given active vertex is aligned with the direction of energy flux at the given active vertex (as determined by ray-based module 22 according to the initial ray-based beam solution).

Once the coordinate systems are assigned to the active vertices, finite-element module 26 then approximates at each vertex the scalar (two-way) wave equation (e.g., Helmholtz equation) by a one-way wave equation, such as the 15 degree wave equation. The direction of the axis of the one-way wave equation approximation will usually vary from one vertex to the next according to variations in flux direction of the initial ray-based solution. In one embodiment, finite-element module 26 approximates the scalar wave equation by generating a finite-element mesh along the active vertices that describes the one-way wave equation. For example, finite -element module 26 may, for a given active vertex, select a hat function as the test function in the Galerkin method to generate a discrete equation corresponding to the given active vertex (although the resulting equation will contain unknowns for all neighboring vertices as well). Finite-element module 26 then solves the system of equations generated for the active vertices by using the ray-based initial beam solution as a starting solution to the system of equations. Finite-element module 26 may implement an iterative matrix solution technique (e.g., an iterative bi-conjugate gradient method) to converge on a final solution for the system of equations.

Figure 4:
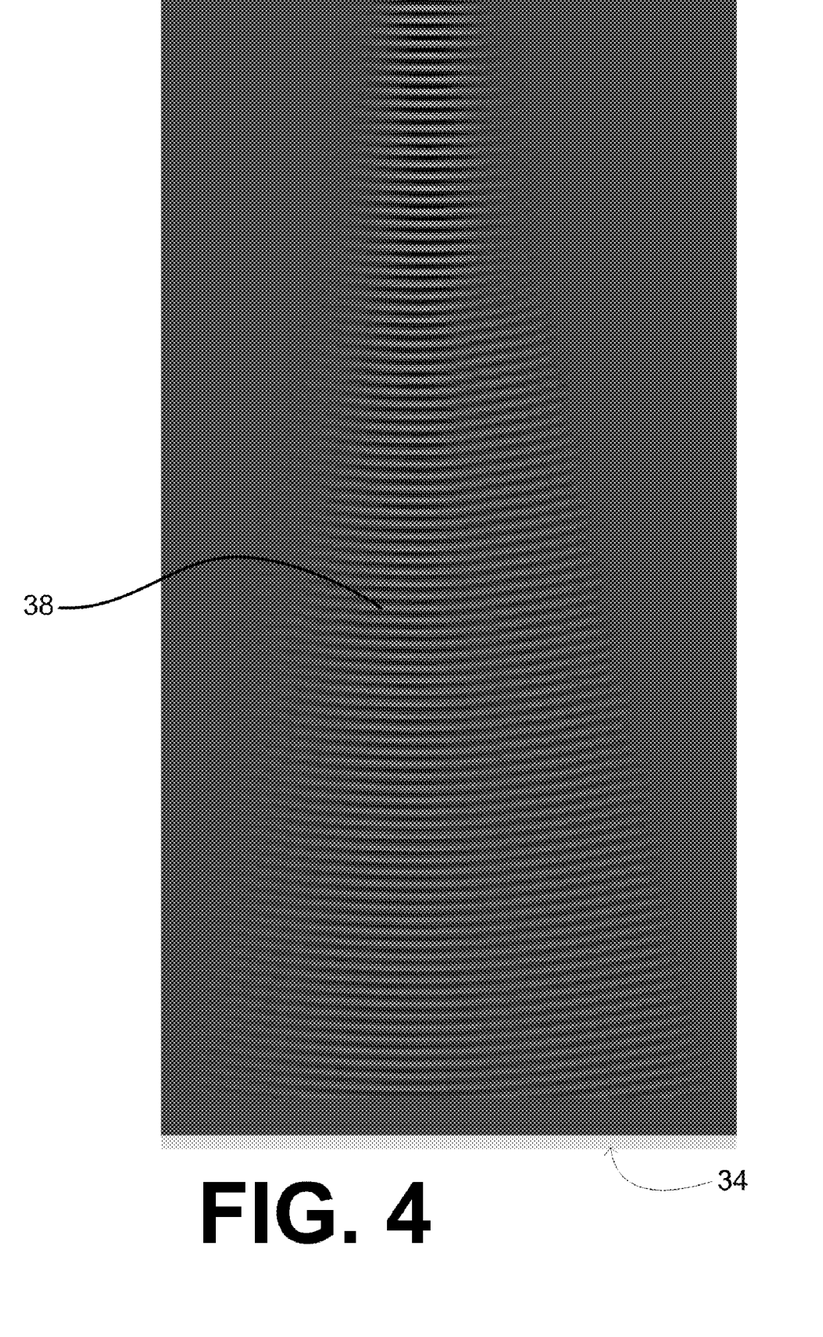
FIG. 4 illustrates a refined finite-element beam solution for the initial frequency, according to one or more embodiments of the invention.

By way of illustration, FIG. 4 shows seismic volume of interest 34. A refined finite-element beam solution 38 for the initial frequency is also shown. As was mentioned above with respect to FIG. 3, seismic volume of interest 34 includes a low-velocity inclusion to the right of the seismic waves. As should be appreciated from FIG. 4, refined finite-element beam solution 38 for the initial frequency is more accurate than the corresponding ray-based beam solution (initial ray-based beam solution 36 shown in FIG. 3) in that refined finite-element beam solution 38 accurately depicts the refraction of the seismic waves at the initial frequency by the low velocity inclusion within seismic volume of interest 34. This refraction is illustrated in FIG. 4 by the asymmetric spreading of the seismic waves with respect to the vertical (spreading is more pronounced on the right side where the low velocity inclusion is located).

Referring back to system 10 in FIG. 1, upon determination of the refined finite-element beam solution, finite-element module 26 stores the refined finite-element beam solution at each of the active vertices, and information derived from the refined finite-element beam solution (e.g., to electronic storage 12). The information derived from the refined finite-element beam solution may include, for example, travel time (e.g., the real part of travel time), energy flux (e.g., the direction of energy flux averaged over a neighborhood within about one wavelength from an active vertex), and/or other information.

Figure 5:
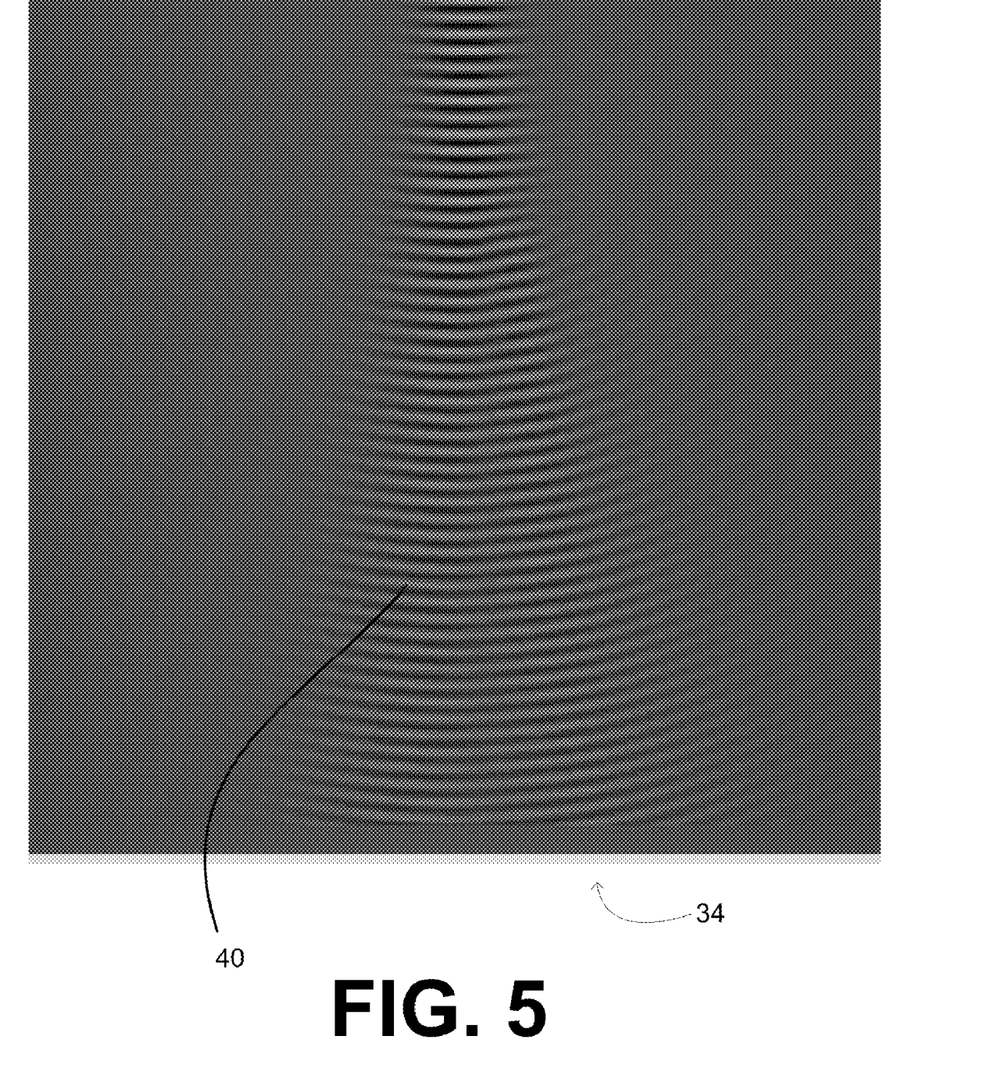
FIG. 5 illustrates a refined finite-element beam solution for a frequency that is less than the initial frequency, in accordance with one or more embodiments of the invention.

Once the refined finite-element beam solution for the initial frequency is determined, system 10 iterates the process followed to determine this solution in order to determine a refined finite-element beam solution for a next frequency in the set of frequencies determined by frequency module 20. In one embodiment, the next frequency will be lower than the initial frequency (although this is not limiting). As the frequency of seismic waves decreases, the solution will become less localized. This is illustrated in FIG. 5, which shows a refined finite -element beam solution 40 in seismic volume 34 for seismic waves having a frequency lower than the initial frequency. As can be seen from a comparison between refined finite-element beam solution 40 and refined finite-element beam solution 38 for the initial frequency shown in FIG. 4, at the lower frequency corresponding to refined finite-element beam solution 40, waves propagate in a more diffuse manner.

Referring back to the illustration of system 10 in FIG. 1, due to the reduced localization of wave propagation at the next frequency (which is lower than the initial frequency), vertex module 24 identifies additional vertices in the mesh defined by mesh module 18 through which the refined finite-element beam solution for the next frequency will likely pass, and these vertices then become active vertices. If the next frequency were higher than the initial frequency, then vertex module identifies a reduced set of vertices through with the refined finite-element beam solution for the next frequency would likely pass.

Where the next frequency is less than the initial frequency, ray-based module 22 next implements ray-based extrapolations from the refined finite-element solution for the initial frequency to determine approximate travel times and directions of energy flux for the additional active vertices. These travel times and directions of energy flux are stored (e.g., to electronic storage 12).

Ray-based module 22 determines an approximate initial beam solution of seismic wave propagation at the next frequency through the active vertices (e.g., including the additional active vertices). The ray-based approximation of a wave field (u) can be expressed as:

$$u(r,\omega) \approx A(r)\exp[i\omega T(r)]; \quad (1)$$

where r represents position within the seismic volume of interest, A represents amplitude, and T represents travel time. The next frequency ($\omega_{next}$) can be expressed as $\omega_{max} - \Delta\omega$, where $\omega_{max}$ represents the initial frequency and $\Delta\omega$ represents the interval between the initial frequency and the next frequency. A combination of these relationships suggests ray-based module 22 may implement the following approximation to derive the wave field at the next frequency from the refined finite-element beam solution for the initial frequency:

$$u(r,\omega_{max}-\Delta\omega_{next}) \approx \exp[-i\Delta\omega T(r)]u(r,\omega_{max}). \quad (2)$$

Once an approximate initial beam solution of seismic wave propagation at the next frequency is determined by ray-based module 22, finite-element module 26 implements the approximate initial beam solution for the next frequency and the active vertices identified by vertex module 24 (including the additional active vertices) to derive a refined finite-element beam solution that approximates the propagation of seismic waves at the next frequency through the seismic volume of interest.

To derive the refined finite-element beam solution for the next frequency, finite-element module 26 again assigns a coordinate system to each of the active vertices. This time the coordinate systems are assigned based on information derived from the refined finite-element beam solution for the initial frequency. In one embodiment, the coordinate systems are assigned such that for a given active vertex one axis (e.g., the z axis) of the coordinate system assigned to the given active vertex is aligned with the direction of energy flux at the given active vertex. The energy flux at the given active vertex is either the energy flux determined by finite-element module 26 from the refined finite-element beam solution for the initial frequency, or the energy flux determined by ray-based module 22 by extrapolating the refined finite-element beam solution for the additional active vertices.

Once the coordinate systems are assigned to the active vertices, finite-element module 26 again generates a finite-element mesh along the active vertices (including the additional active vertices) that describes the one-way wave equation for seismic waves propagating at the next frequency. In one embodiment, to accomplish this for a given active vertex finite-element module 26 selects a function, such as a hat function, as the test function in the Galerkin method to generate a discrete equation corresponding to the given active vertex (although the equation will include unknowns for neighboring vertices as well). Finite-element module 26 then solves the system of equations generated for the active vertices by using the approximate initial beam solution for the next frequency as a starting solution to the system of equations. Finite-element module 26 may implement an iterative matrix solution technique (e.g., an iterative bi-conjugate gradient method) to converge on a final solution for the system of equations. This final solution is a refined finite-element beam solution describing the propagation of seismic waves through the seismic volume of interest at the next frequency.

The refined finite-element beam solution for the next frequency is then implemented by processor 16 to generate a refined finite-element beam solution for another, neighboring frequency in the set of frequencies determined by frequency module 20 in the same manner that the refined finite-element beam solution for the initial frequency was used to generate the refined finite-element beam solution for the next frequency. This iteration is continued through the set of frequencies determined by frequency module 20, for example from highest frequency to lowest frequency, from lowest frequency to highest frequency (where the initial frequency is a relatively low frequency), or from the initial frequency in both directions. Once refined finite-element beam solutions for the frequencies in the set of frequencies have been determined, processor 16 aggregates the refined finite-element beam solutions for the individual frequencies in the set of geologically significant frequencies. This aggregation results in a finite-element beam solution that describes the propagation of the pulses of seismic energy through the seismic volume of interest.

Figure 6:
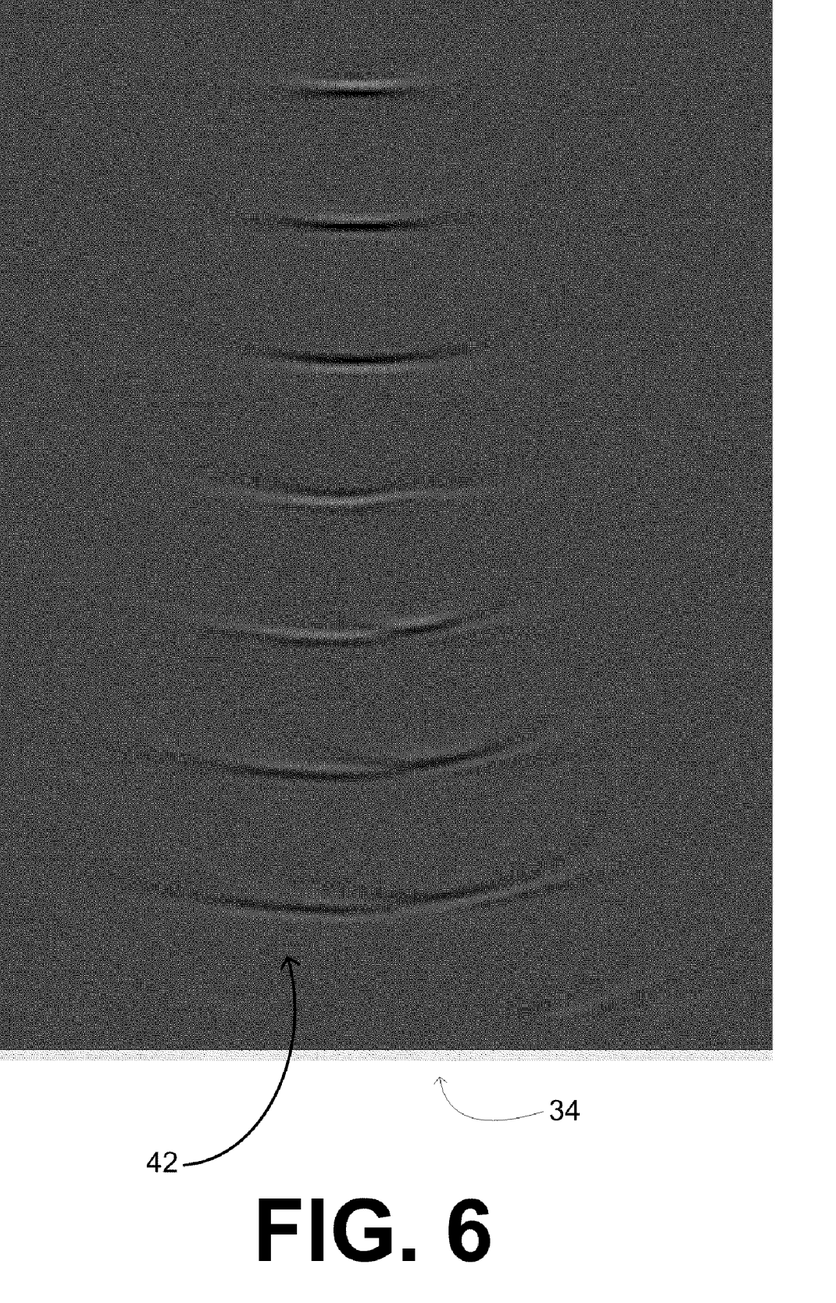
FIG. 6 illustrates a refined finite-element beam solution for pulses of seismic energy through a seismic volume of interest, according to one or more embodiments of the invention.

By way of illustration, FIG. 6 shows a refined finite-element beam solution 42 for the pulses of seismic energy through seismic volume of interest 34. Refined finite-element beam solution 42 includes the refined finite-element beam solutions 36 and 38 for the initial frequency and the next frequency, respectively, as well as the refined finite-element beam solutions for the rest of the frequencies in the set of geologically significant frequencies.

Figure 7:
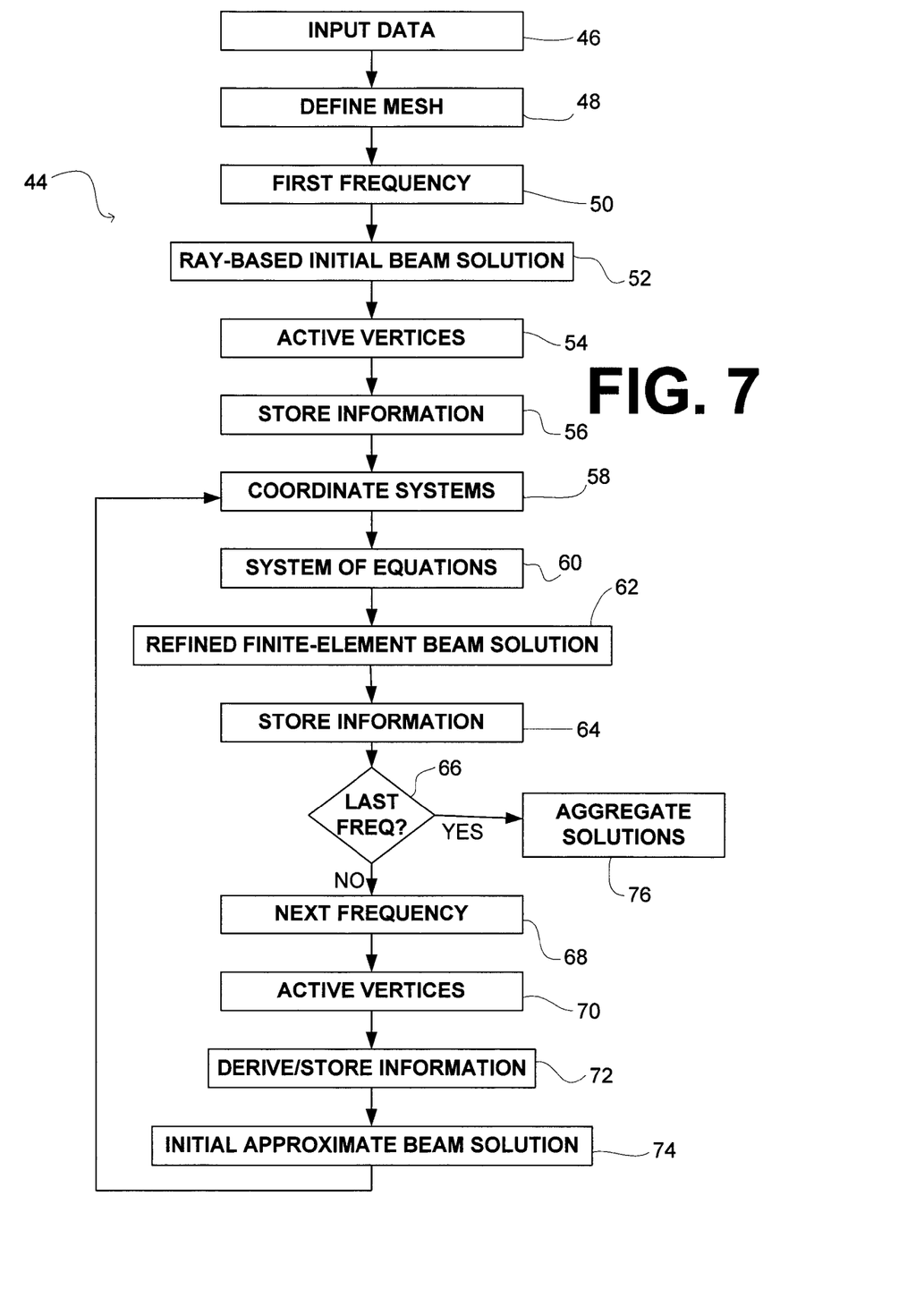
FIG. 7 illustrates a method of deriving subsurface seismic wave fields in a seismic volume of interest from seismic data.

FIG. 7 illustrates a method 44 of deriving subsurface seismic wave fields in a seismic volume of interest from seismic data. The operations of method 44 presented below are intended to be illustrative. In some embodiments, method 44 may be accomplished with one or more additional operations not described, and/or without one or more of the operations discussed. Additionally, the order in which the operations of method 44 are illustrated in FIG. 7 and described below is not intended to be limiting.

In some embodiments, method 44 may be implemented in one or more processing devices (e.g., processor 16 shown in FIG. 1 and described above). The one or more processing devices may include one or more devices executing some or all of the operations of method 44 in response to instructions stored electronically on an electronic storage medium. The one or more processing devices may include one or more devices configured through hardware, firmware, and/or software to be specifically designed for execution of one or more of the operations of method 44. Although some of the operations of method 44 are described below with respect to system 10 shown in FIG. 1 and described above, this is not intended to be limiting. In some embodiments, method 44 may be implemented in a variety of contexts other than system 10.

At an operation 46, input data is obtained. The input data comprises a seismic data set that represents the seismic volume of interest. At an operation 48, a mesh is defined within the seismic volume of interest. In one embodiment, operation 48 is performed by a mesh module that is similar to or the same as mesh module 18 (shown in FIG. 1 and described above).

At an operation 50, a first frequency is determined. The first frequency is the initial frequency at which propagation of seismic waves through the seismic volume will be analyzed. In one embodiment, the first frequency is the maximum frequency in a set of predetermined frequencies. In one embodiment, the first frequency is lower than the maximum frequency in a set of predetermined frequencies. The set of predetermined frequencies include a set of geologically significant frequencies arranged between a maximum geologically significant frequency and a minimum geologically significant frequency. In one embodiment, the set of predetermined frequencies includes one or more preliminary frequencies that are greater than the maximum geologically significant frequency. In one embodiment, operation 50 is performed by a frequency module that is the same as or similar to frequency module 20 (shown in FIG. 1 and described above).

At an operation 52, a ray-based initial beam solution that approximates the propagation of seismic waves through the seismic volume at the first frequency is determined. In one embodiment, operation 52 is performed by a ray-based module that is similar to or the same as ray-based module 22 (shown in FIG. 1 and described above).

At an operation 54, vertices within the mesh defined at operation 48 through which the ray-based initial beam solution determined at operation 52 passes are identified as active vertices. In one embodiment, operation 54 is performed by a vertex module that is the same as or similar to vertex module 24.

At an operation 56, the ray-based initial beam solution and/or information derived from the ray-based initial beam solution at the active vertices identified at operation 54 is stored. The information derived from the ray-based initial beam solution may include one or more of travel time (e.g., the real part of travel time), energy flux (e.g., the direction of energy flux averaged over a neighborhood within about one wavelength from an active vertex), and/or other information. In one embodiment, information stored at operation 56 is stored to electronic storage that is the same as or similar to electronic storage 12 (shown in FIG. 1 and described above).

At an operation 58, coordinate systems are assigned to the active vertices identified at operation 54. The coordinate systems are assigned to align with the energy flux of the ray-based initial beam solution such that at a given active vertex the local coordinate system includes an axis (e.g., the z axis) that is aligned with the direction of energy flux of the ray-based initial beam solution, which was stored at operation 56. In one embodiment, operation 58 is performed by a finite-element module that is the same as or similar to finite-element module 26 (shown in FIG. 1 and described above).

At an operation 60, a system of equations that define a finite element approximation of a wave equation describing the propagation of the seismic waves of the first frequency through the seismic volume of interest is generated. The system of equations includes equations formed at the active vertices identified at operation 54. In one embodiment, for a give active vertex, an equation is defined by selecting a hat function as the test function in the Galerkin method. In one embodiment, operation 60 is performed by the finite-element module.

At an operation 62, the system of equations defined at operation 60 is solved with an iterative matrix solution technique using the ray-based initial solution determined at operation 52 and stored at operation 56 as the starting solution. Convergence on a solution in operation 62 generates a refined finite-element beam solution describing the propagation of seismic waves through the seismic volume of interest at the first frequency. In one embodiment, operation 62 is performed by the finite-element module.

At operation 64, information derived from the refined finite-element beam solution for the first frequency generated at operation 62 is stored for the active vertices. The information may include energy flux through individual ones of the active vertices, travel times at the active vertices, and/or other information. In one embodiment, the information stored at operation 66 is stored to the electronic storage.

At an operation 66, a determination is made as to whether the current frequency being evaluated is the last frequency. If the frequency being evaluated is not the last frequency being evaluated, then method 44 proceeds to an operation 68.

At an operation 68, a next frequency is determined. The next frequency is next frequency in the set of frequencies at which propagation of seismic waves through the seismic volume will be analyzed. In one embodiment, the next frequency is the next lowest frequency after the frequency that has just been analyzed (e.g., the first frequency on the first iteration through method 44). In one embodiment, the next frequency is the next highest frequency to the frequency that has just been analyzed (e.g., the first frequency on the first iteration through method 44). In one embodiment, operation 68 is performed by the frequency module.

At an operation 70, active vertices in the mesh identified at operation 48 are identified. The active vertices identified at operation 70 may include additional active vertices (during iteration downward in frequency), or fewer active vertices (during iteration upward in frequency) with respect to the active vertices identified for the previous frequency. Additional active vertices are vertices in the mesh that were not identified previously as active, and which are anticipated to receive the solution describing the propagation of seismic waves through the seismic volume. In one embodiment, operation 70 is performed by the vertex module.

At an operation 72, information is derived from the refined finite-element beam solution for the first frequency (or the previous frequency on subsequent iterations through method 44) is determined for the additional active vertices identified at operation 72. The information may include one or more of energy flux (e.g., direction of energy flux averaged over a neighborhood within about one wavelength from an active vertex), travel time (e.g., real part of travel time), and/or other information. The information is determined for the additional active vertices using ray-based extrapolations. The information derived at operation 72 is stored. In one embodiment, operation 72 is performed by the ray-based module.

At an operation 74, an initial approximate beam solution that approximates the propagation of seismic waves at the next frequency through the seismic volume of interest is determined. The initial approximation beam solution for the next frequency is determined by applying ray-based approximations to extend the refined finite-element beam solution for the previous frequency (e.g., the first frequency on the first iteration through method 44) to the next frequency. In one embodiment, operation 74 is performed by the ray-based module.

From operation 74, method 44 returns to operation 58, where coordinate systems are assigned to the active vertices for the next frequency. The coordinate systems are aligned with the energy flux determined and/or stored at operations 66 and/or 72.

At operation 60, a system of equations that define a finite element approximation of a wave equation describing the propagation of the seismic waves of the next frequency through the seismic volume of interest is generated.

At operation 62, the system of equations defined at operation 60 for the next frequency is solved with an iterative matrix solution technique using the approximate initial beam solution determined at operation 74 as the starting solution. Convergence on a solution in operation 62 generates a refined finite-element beam solution describing the propagation of seismic waves through the seismic volume of interest at the next frequency.

As method 44 returns to operation 64, a determination is made as to whether the next frequency is the last frequency to be analyzed. If the next frequency is not the last frequency to be analyzed, method 44 proceeds to operation 66, and operations 68, 70, 72, 74, 58, 60, and 62 are repeated for a lower frequency in the predetermined set of frequencies.

If the next frequency is the last frequency to be analyzed, method 44 proceeds to an operation 76, where the refined finite-element beam solutions for the set of geologically significant frequencies are aggregated to generate a finite-element beam solution that describes the propagation of the pulses of seismic energy through the seismic volume of interest.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method of generating and storing to an electronic storage medium approximations of a set of wave equations describing the propagation of seismic waves of one or more frequencies through a seismic volume of interest, the method comprising:
   (a) determining a ray-based initial beam solution that approximates the propagation of seismic waves at a first frequency through the seismic volume of interest as a set of one or more beams;
   (b) generating a system of equations that define a finite element approximation of a wave equation describing the propagation of the seismic waves of the first frequency through the seismic volume of interest;
   (c) solving the system of equations generated at step (b) implementing the ray-based initial beam solution determined at step (a) as a starting solution to the system of equations, thereby creating a refined finite element beam solution approximating the propagation of the seismic waves of the first frequency through the seismic volume of interest with an enhanced accuracy over the approximation of the ray-based initial beam solution;
   (d) identifying a second frequency;
   (e) determining an approximate initial beam solution of seismic wave propagation at the second frequency through the seismic volume of interest, wherein the approximate initial beam solution at the second frequency is obtained using ray-based approximations to modify the refined finite-element beam solution for the first frequency achieved at step (c);
   (f) generating a system of equations that define a finite element approximation of a wave equation describing the propagation of the seismic waves of the second frequency through the seismic volume of interest;
   (g) solving the system of equations generated at step (f) implementing the approximate initial beam solution determined at step (e) as a starting solution to the system of equations generated at step (f), thereby creating a refined finite element beam solution approximating the propagation of the seismic waves of the second frequency through the seismic volume of interest; and
   (h) storing the refined finite element beam solution created at step (g) to an electronic storage medium.

2. The method of claim 1, wherein the second frequency is lower than the first frequency.

3. The method of claim 1, further comprising defining a mesh through a seismic volume of interest, and wherein individual ones of the equations included in the system of equations generated at step (b) correspond to individual ones of the vertices of the mesh through which the ray-based initial beam solution passes.

4. The method of claim 2, wherein individual ones of the equations included in the system of equations generated at step (f) correspond to individual ones of the vertices of the mesh through which the approximate initial beam solution passes.

5. The method of claim 3, wherein step (a) further comprises determining the energy flux of the seismic waves of the first frequency through the seismic volume of interest at individual ones of the vertices of the mesh, and wherein a given equation from the set of equations generated by step (b) is defined according to a coordinate system that is determined based on the energy flux determined at step (a) for the vertex corresponding to the given equation.

6. The method of claim 4, further comprising: (h) determining, from the refined finite-element beam solution achieved at step (c), the energy flux of the seismic waves of the first frequency through the seismic volume of interest at individual ones of the vertices, and wherein a given equation from the set of equations generated by step (f) is defined according to a coordinate system that is determined based on the energy flux determined at step (h) for the active vertex corresponding to the given equation.

7. The method of claim 1, wherein steps (c) and (g) each comprise implementing an iterative matrix solution technique.

8. A computer-implemented method of generating and storing to an electronic storage medium approximations of a set of wave equations describing the propagation of seismic waves of one or more frequencies through a seismic volume of interest, the method comprising:
   (a) determining a ray-based initial beam solution that describes the propagation of seismic waves at a first frequency through the seismic volume of interest as a set of one or more beams;
   (b) determining, based on information derived from the ray-based initial beam solution, a refined finite-element beam solution that describes the propagation of the seismic waves at the first frequency through the seismic volume of interest by approximating the two-way wave equation with a one-way wave equation derived such that the axis of the one-way wave equation are oriented in the direction of flux determined according to the ray-based initial beam solution determined at step (a); and
   (c) storing the refined finite-element beam solution determined at (b) to an electronic storage medium.

9. The method of claim 8, further comprising:
   (d) identifying a second frequency;
   (e) determining, based on the refined finite-element beam solution describing the propagation of the seismic waves at the first frequency through the seismic volume of interest, an approximate initial beam solution of seismic wave propagation at the second frequency through the seismic volume of interest, wherein the approximate initial beam solution at the second frequency is obtained using ray-based approximations to modify the refined finite-element beam solution for the first frequency achieved at step (b);

(f) determining, based on information derived from the approximate initial beam solution describing the propagation of seismic waves at the second frequency through the seismic volume of interest, a refined finite-element beam solution that describes the propagation of the seismic waves at the second frequency through the seismic volume of interest by approximating the two-way wave equation with a one-way wave equation derived such that the axis of the one-way wave equation are oriented in the direction of flux.

10. The method of claim 9, further comprising iterating steps (d)-(f) for sample frequencies within a predetermined range of frequencies, wherein step (d) for a given sample frequency within the predetermined range of frequencies comprises identifying the given sample frequency, and the given sample frequency is less than a previous sample frequency for which steps (d)-(f) were performed immediately prior to performing step (d) for the given sample frequency, wherein step (e) for the given sample frequency comprises determining, based on a refined finite-element beam solution describing the propagation of seismic waves at the previous sample frequency through the seismic volume of interest, an approximate initial beam solution of seismic wave propagation at the given sample frequency through the seismic volume of interest, wherein the approximate initial beam solution at the given sample frequency is obtained using ray-based approximations to modify the refined finite-element beam solution for the previous sample frequency achieved at step (f) for the previous sample frequency, and wherein step (f) for the given sample frequency comprises determining, based on information derived from the approximate initial beam solution describing the propagation of seismic waves at the given sample frequency through the seismic volume of interest, a refined finite-element beam solution describing the propagation of the seismic waves at the given sample frequency through the seismic volume of interest.

11. The method of claim 10, wherein the predetermined range of frequencies comprises a range of frequencies of interest, the performance of steps (d)-(f) for which enable geologically significant information to be determined, and wherein the first frequency is outside of the range of frequencies of interest.

12. A system configured to approximate a set of wave equations describing the propagation of seismic waves of one or more frequencies through a seismic volume of interest, the system comprising:

one or more processors executing one or more modules, the modules comprising:

a ray-based module configured to determine a ray-based initial beam solution that describes the propagation of seismic waves at a first frequency through the seismic volume of interest as a set of one or more beams; and a finite-element module configured to determine, based on information derived from the ray-based initial beam solution determined by the ray-based module, a refined finite-element beam solution that describes the propagation of the seismic waves at the first frequency through the seismic volume of interest by approximating the two-way wave equation with a one-way wave equation derived such that the axis of the one-way wave equation is oriented in the direction of flux determined according to the ray-based initial beam solution.

13. The system of claim 12, wherein the one or more modules further comprise:

a frequency module configured to identify a second frequency of seismic waves;

wherein the ray-based module is further configured to determine, based on the refined finite-element beam solution determined by the finite-element module for the first frequency, an approximate initial beam solution of seismic wave propagation at the second frequency through the seismic volume of interest, wherein the approximate initial beam solution at the second frequency is obtained using ray-based approximations to modify the refined finite-element beam solution for the first frequency, and wherein the finite-element module is further configured to determine, based on information derived from the approximate initial beam solution determined by the ray-based module for the second frequency, a refined finite-element beam solution describing the propagation of the seismic waves at the second frequency through the seismic volume of interest.

14. The system of claim 13, wherein the frequency module is further configured to identify a third frequency of seismic waves, wherein the ray-based module is further configured to determine, based on the refined finite-element beam solution determined by the finite-element module for the second frequency, an approximate initial beam solution of seismic wave propagation at the third frequency through the seismic volume of interest, wherein the approximate initial beam solution at the third frequency is obtained using ray-based approximations to modify the refined finite-element beam solution for the second frequency, and wherein the finite-element module is further configured to determine, based on information derived from the approximate initial beam solution determined by the ray-based module for the third frequency, a refined finite-element beam solution describing the propagation of the seismic waves at the third frequency through the seismic volume of interest.

15. The system of claim 14, wherein the difference between the first frequency and the second frequency is different than the difference between the second frequency and the third frequency.

* * * * *